United States Patent
Woehrle et al.

(10) Patent No.: US 10,312,562 B2
(45) Date of Patent: Jun. 4, 2019

(54) METAL-OXYGEN BATTERY SYSTEM HAVING A SUCTION FUNCTION AND A BLOWING FUNCTION

(71) Applicant: Robert Bosch GmbH, Stuttgart (DE)

(72) Inventors: Thomas Woehrle, Munich (DE); Felix Eberle, Kyoto (JP); Bernd Schumann, Rutesheim (DE); Calin Iulius Wurm, Meitingen (DE); Vikram Anil Godbole, Leinfelden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 749 days.

(21) Appl. No.: 14/944,533

(22) Filed: Nov. 18, 2015

(65) Prior Publication Data

US 2016/0149278 A1    May 26, 2016

(30) Foreign Application Priority Data

Nov. 18, 2014   (DE) .......................... 10 2014 223 484

(51) Int. Cl.
| | |
|---|---|
| *H01M 12/02* | (2006.01) |
| *H01M 12/08* | (2006.01) |
| *H01M 4/38* | (2006.01) |

(52) U.S. Cl.
CPC ........... *H01M 12/02* (2013.01); *H01M 12/08* (2013.01); *H01M 4/382* (2013.01); *Y02E 60/128* (2013.01)

(58) Field of Classification Search
None
See application file for complete search history.

(56) References Cited

U.S. PATENT DOCUMENTS 5,510,209 A    4/1996   Abraham et al.

FOREIGN PATENT DOCUMENTS

| DE | 69401130 T2 | 5/1997 |
| DE | 69323622 T2 | 7/1999 |
| DE | 102010051964 A1 | 7/2011 |
| DE | 102010033020 A1 | 2/2012 |
| DE | 102013206740 A1 | 10/2014 |
| EP | 0639867 A1 | 2/1995 |
| JP | 2009230981 A1 | 10/2009 |

OTHER PUBLICATIONS

Gerold et al; DE 102010033020 English Translation (Year: 2010).*
Peng et al., "A Reversible and Higher-Rate Li—O2 Battery," Sciencemag.org., Aug. 3, 2012, pp. 563-566, vol. 337.
Christensen et al., "A Critical Review of Li/Air Batteries," Critical Reviews in Electrochemical and Solid-State Science and Technology, Dec. 29, 2011, pp. 1-30, 159.

* cited by examiner

*Primary Examiner* — Sarah A. Slifka
(74) *Attorney, Agent, or Firm* — Norton Rose Fulbright US LLP; Gerard Messina (57) ABSTRACT

A metal-oxygen battery system, in particular a lithium-oxygen battery system, includes at least one battery cell, in particular a lithium-oxygen cell, including an oxygen cathode, a metal anode, and a metal ion-conducting separator situated between the cathode and the anode. To increase the current carrying capacity, the battery system also includes a turbomachine system which is connected to the oxygen cathode in a gas-conducting manner and which may be switched over between a suction function and a blowing function, and/or an exhaust gas supply line for supplying a gas low in oxygen to the oxygen cathode. Also described is a corresponding operating method.

16 Claims, 5 Drawing Sheets

METAL-OXYGEN BATTERY SYSTEM HAVING A SUCTION FUNCTION AND A BLOWING FUNCTION

FIELD OF THE INVENTION

The present invention relates to a metal-oxygen battery system and a corresponding operating method.

BACKGROUND INFORMATION

Lithium-oxygen cells and batteries, also referred to as lithium-air cells and batteries, are ideally suited for a wide range of applications, and are characterized, among other things, by a high energy density or specific energy.

Lithium-oxygen cells include a cathode, also referred to as a positive electrode, based on oxygen and an anode, also referred to as a negative electrode, based on lithium.

During discharging of a lithium-oxygen cell, the following reactions take place at the anode and the cathode:

$2Li \rightarrow 2Li^+ + 2e^-$     anode:

$2Li^+ + 2e^- + O_2 \rightarrow Li_2O_2$     cathode:

During charging of a lithium-oxygen cell, the following reactions take place at the anode and the cathode:

$2Li^+ + 2e^- \rightarrow 2Li$     anode:

$Li_2O_2 \rightarrow 2Li^+ + 2e^- + O_2$     cathode:

One of the first lithium-air cells, including a metallic lithium anode and an oxygen cathode, is discussed by Abraham et al. in the publication U.S. Pat. No. 5,510,209 A.

Jake Christensen et al. have a review of lithium-air technology in the Journal of The Electrochemical Society (159 (2) R1-R30 (2012)).

Lithium-air cells which include an ion-conducting separator diaphragm based on glass are understood to be from PolyPlus, California, United States.

In Bruce et. al. (A Reversible and Higher-Rate Li—$O_2$ Battery; Zhangquan Peng, Stefan A. Freunberger, Yuhui Chen, Peter G. Bruce; Science Express Reports; Jul. 25, 2012; Science DOI: 10.1126/science.1223985), are discussed nanoporous gold cathodes.

Patent document DE 10 2010 033 020 A1 discusses a secondary lithium-air-battery system which includes a housing in which air that is compressed with the aid of a pump is present.

Patent document JP 2009-230981 A discusses a lithium-air battery which includes an oxygen pump that is fastened to a cover and thus forms a positive chamber which contains a closed space. The oxygen pump is capable of electrochemically pumping oxygen from the air outside the positive chamber into the positive chamber, so that, when the oxygen concentration in the positive chamber drops due to the discharging reaction, oxygen from the air may be supplied to the positive chamber via the pump.

Patent document DE 10 2010 051 964 A1 discusses a secondary lithium-air-battery system which includes a pump, with the aid of which electrolyte is pumpable from a reservoir to a cathode.

SUMMARY OF THE INVENTION

The subject matter of the present invention relates to a metal-oxygen battery system, in particular a lithium-oxygen battery system, which includes at least one battery cell including a cathode, an anode, and a metal ion-conducting separator situated between the cathode and the anode.

The cathode in particular is an oxygen cathode. The oxygen cathode may in particular include a catalyst for catalyzing the oxidation of peroxides and/or oxides and/or for reducing elemental oxygen. The catalyst may in particular be applied to a porous, electrically conductive and optionally also metal ion-conducting, for example lithium ion-conducting, matrix, for example made of carbon and/or a metal, for example gold. For example, oxygen and/or substances which arise during discharging, such as lithium peroxide ($Li_2O_2$), may be accommodated in the pores, which may have an average size in the nanometer range, for example.

The anode is in particular a metal anode. For example, the anode may be a lithium anode, for example made of metallic lithium or a lithium alloy, for example a lithium-silicon anode, or based on a lithium intercalation material, for example a lithium intercalation anode, based on graphite, for example. In particular, the anode may be a lithium anode made of metallic lithium or a lithium alloy.

The at least one battery cell may in particular be a metal-oxygen cell. In particular, the at least one battery cell may be a lithium-oxygen cell.

The separator may in particular be a lithium ion-conducting separator. For example, the separator may be a lithium ion-conducting layer or diaphragm. The cathode and the anode may be electrically insulated from one another by the separator.

According to the present invention, the battery system also includes a turbomachine system which may be switched over between a suction function and a blowing function, and in particular is connected to the oxygen cathode in a gas-conducting manner, and/or includes an exhaust gas supply line for supplying a gas low in oxygen to the oxygen cathode.

A turbomachine system may be understood in particular to mean a system which includes a turbomachine. The turbomachine may be a mechanical turbomachine, for example. For example, the turbomachine may be a blower and/or a compressor and/or a (some other), for example mechanical, (gas) pump, in particular for moving gas, for example an air pump.

A gas low in oxygen may be understood in particular to mean a gas or gas mixture which contains less oxygen than (ambient) air, for example <20.9% by volume, for example <20% by volume, of oxygen, based on the total volume of the gas or gas mixture. For example, gas low in oxygen may be oxygen-depleted air, for example gas remaining during discharging, and/or optionally (pure) nitrogen and/or optionally one or multiple other inert gases, for example argon.

An oxygen-rich gas may be understood in particular to mean a gas or gas mixture which contains more oxygen than (ambient) air, for example >20.9% by volume, for example ≥22% by volume, of oxygen, based on the total volume of the gas or gas mixture. For example, oxygen-rich gas may be oxygen-enriched air or optionally (pure) oxygen, for example oxygen which is released during charging.

Due to the turbomachine system being equipped with a suction function and a blowing function, supplying gas, in particular oxygen, to the oxygen cathode as well as discharging gas, in particular oxygen, from the oxygen cathode may advantageously be easily achieved by the turbomachine system.

The turbomachine system may be configured in particular for supplying oxygen, in particular from the outside or from outside the cell, to the oxygen cathode during discharging, in particular of the at least one battery cell, and for discharging oxygen from the oxygen cathode, in particular to the outside or out of the cell, during charging, in particular of the at least one battery cell.

In particular, during charging by the turbomachine system, oxygen released at the oxygen cathode may advantageously be discharged from the oxygen cathode and in particular removed from the cell.

By applying a negative pressure, for example a vacuum, oxygen released during charging may be discharged, for example by itself, as a gas stream from the oxygen cathode and in particular removed from the cell by the turbomachine system, for example by the suction function of the turbomachine system.

Alternatively, during charging by the turbomachine system, for example by the suction function or by the blowing function, in particular by the suction function, of the turbomachine system, the released oxygen, also as a gas stream, may be exhausted from the oxygen cathode and in particular removed from the cell with the aid of a carrier gas stream or a gas stream being exhausted, which may be, for example, air or in particular a gas low in oxygen, for example oxygen-depleted air or essentially pure nitrogen. Electrical energy for operating the turbomachine system may advantageously be saved, for example compared to generating a negative pressure or vacuum. The gas being exhausted may in particular be a gas low in oxygen which is supplied via the exhaust gas supply line.

In particular, during charging, oxygen released at the oxygen cathode may be exhaustible via a gas low in oxygen supplied via the exhaust gas supply line.

The exhaust gas supply line may be, for example, a gas connection, for example a high-pressure connection, for connecting a gas line and/or a gas cylinder for supplying a gas low in oxygen.

The turbomachine system according to the present invention and the exhaust gas supply line according to the present invention are based on a shared concept, namely, a shift of the chemical equilibrium according to Le Chatelier's principle of least constraint. According to Le Chatelier's principle of least constraint, when a constraint due to a change of an external condition is imposed on a system which is in chemical equilibrium, as a result of this disturbance of the equilibrium, a new equilibrium is established which evades the constraint. An increase in pressure promotes a volume-decreasing reaction, and conversely, a decrease in pressure promotes a volume-increasing reaction, of the chemical equilibrium. The reaction of the chemical equilibrium which subsequently produces the product is promoted by removal of end product and/or increased addition of reactant.

The electrochemical reaction of a metal-oxygen cell is based on a chemical equilibrium having the following formula by way of example:

The electrochemical reaction of a lithium-oxygen cell is based on a chemical equilibrium having the following formula by way of example:

Due to the battery system including a turbomachine system which may be switched over between a suction function and a blowing function and which is connected to the oxygen cathode in a gas-conducting manner, during discharging, the pressure may be increased, and the volume-decreasing reaction, namely:

may thus be promoted, by the blowing function of the turbomachine system, and also during charging, the pressure may be decreased, and the volume-increasing reaction, namely:

may thus be promoted, by the suction function.

In addition, during charging, produced oxygen may advantageously be removed or diluted by the turbomachine system, and the charging reaction which subsequently produces oxygen, namely:

may thus be promoted, and the chemical equilibrium in the electrochemical decomposition of the metal (per)oxide, for example lithium peroxide ($Li_2O_2$), may be shifted toward oxygen formation. In principle, this may be achieved by the suction function as well as by the blowing function of the turbomachine system. For example, during charging, oxygen produced from metal (per)oxide, for example lithium peroxide ($Li_2O_2$), may be exhausted, for example without residue, and removed in this way by passing, for example pumping, through a quantity of gas, in particular an increased quantity of gas, for example by drawing in or blowing in a gas, for example air or gas low in oxygen. However, due to the positive effect of a pressure reduction during charging explained above, this may be achieved particularly advantageously by the suction function of the turbomachine system.

In addition, reactant, in particular oxygen required during discharging, may advantageously be supplied by the turbomachine system, and the discharging reaction which produces the metal (per)oxide, for example lithium peroxide ($Li_2O_2$), namely:

may thus be promoted. In particular, during discharging, the quantity of oxygen, for example the quantity of air, may advantageously be increased by a multiple of the required quantity by the turbomachine system, so that more oxygen is available than is needed for discharging, and the equilibrium is thus shifted toward formation of metal (per)oxide, for example lithium peroxide ($Li_2O_2$). In addition, an oxygen gradient, which may be small, may thus advantageously be achieved in the oxygen cathode. In principle, this may also be achieved by the blowing function as well as by the suction function of the turbomachine system. For example, during discharging, required oxygen may be supplied by passing, for example pumping, through a quantity of gas, in particular an increased quantity of gas, for example by blowing in or drawing in a gas, for example air or oxygen-rich gas. However, due to the positive effect of a pressure increase during discharging explained above, this may be achieved particularly advantageously by the blowing function of the turbomachine system.

Due to the fact that the turbomachine system may be switched over between the suction function and the blowing function, oxygen may thus advantageously be supplied during discharging of the oxygen cathode by increasing the pressure and/or flowing a gas over the oxygen cathode, for example by blowing in or drawing in a gas, in particular air or an oxygen-rich gas, and also during charging, oxygen released at the oxygen cathode may be exhausted by reducing the pressure and/or flowing a gas over the oxygen cathode, for example by drawing in or blowing in a gas, in particular air and/or gas low in oxygen, for example oxygen-depleted air, for example using oxygen-depleted air stored during discharging.

As a result of the battery system including an exhaust gas supply line for supplying a gas low in oxygen to the oxygen cathode, oxygen released at the oxygen cathode during charging may advantageously be exhausted or diluted by supplying a gas low in oxygen, and the charging reaction which subsequently produces oxygen, namely:

$$M_xO_{2y} \rightarrow xM + yO_2$$

$$Li_2O_2 \rightarrow 2Li + O_2$$

may thus likewise be promoted, and the chemical equilibrium in the electrochemical decomposition of the metal (per)oxide, for example lithium peroxide ($Li_2O_2$), may be shifted toward oxygen formation. Due to the blowing out during charging taking place with the aid of a gas low in oxygen, and not with air, for example, advantageously little or no oxygen to be produced is added, so that the equilibrium is shifted by the gas low in oxygen at least less strongly toward the reactant side as in the case of air, or is not even shifted at all.

Due to the blowing function of the turbomachine system during discharging, in addition absorption processes may advantageously be promoted at the oxygen cathode, and the oxygen transport during discharging may thus be improved, and due to the suction function of the turbomachine system during charging and/or supplying a gas low in oxygen via the exhaust gas supply line during charging, desorption processes may advantageously be promoted at the oxygen cathode, and the oxygen transport during charging may thus be improved.

In particular, the oxygen transport processes, for example the speed of the oxygen delivery and of the oxygen discharge, may advantageously be accelerated by the turbomachine system and/or the exhaust gas supply line, as the result of which the high-current carrying capacity may in turn be advantageously increased.

This may be advantageous in particular in high-capacity batteries, for example having a nominal capacity greater than or equal to 5 Ah, for example 10 Ah, and/or a current density of approximately 30 mA/cm$^2$, in which very large quantities of oxygen may arise in the material balance during charging and discharging; for example, for batteries of 2.9 kWh which include 100 cells at 10 Ah each, approximately 418 liters of oxygen may arise during charging, and approximately five times this amount of air may arise during discharging.

In addition, due to more rapid removal of oxygen during charging, the specific energy of the at least one battery cell, and thus of the battery system, may be increased, in particular in the end phase of charging, and a charging current may be achieved, for example at the same charging voltage.

Furthermore, volume surges in the oxygen cathode may be compensated for by the turbomachine system and/or the exhaust gas supply line, and the service life of the at least one battery cell, and thus of the battery system, may thus be prolonged.

Overall, a battery system having a high current carrying capacity, for example having a high high-current carrying capacity, in particular during discharging and also during charging, a high withdrawable capacity, a high energy quantity which is withdrawable over the short term, a high pulse load capacity, a high specific energy, and a long service life may thus be provided in a particularly simple and cost-effective manner.

Within the scope of one specific embodiment, the exhaust gas supply line includes an exhaust gas container for storing and releasing a gas low in oxygen. In particular, during charging, gas low in oxygen may be suppliable from the exhaust gas container to the oxygen cathode, and/or during discharging, gas low in oxygen, for example oxygen-depleted air, remaining at the oxygen cathode may be storable in the exhaust gas container. In particular, during charging, oxygen which is released at the oxygen cathode may be expellable by gas low in oxygen, for example oxygen-depleted air, stored in the exhaust gas container.

Gas low in oxygen which has lost oxygen during discharging and which, for example, generally remains unused, for example excess nitrogen obtained from air during discharging, may advantageously be temporarily stored in the exhaust gas container. The gas low in oxygen temporarily stored in the exhaust gas container, which during discharging with air may be virtually pure nitrogen, in particular which contains only a small proportion of other inert gases, may advantageously be supplied for exhausting or discharging the oxygen released at the oxygen cathode during charging, and the charging reaction which subsequently produces oxygen may thus be promoted, and the chemical equilibrium in the electrochemical decomposition of the metal (per)oxide, for example lithium peroxide ($Li_2O_2$), may be shifted toward oxygen formation, and, for example, a higher charging current at the same charging voltage may be achieved.

The exhaust gas container may advantageously be used as a tank. The exhaust gas container may in particular be configured to be pressure-resistant, i.e., as a pressure vessel. Thus, on the one hand, a fairly large quantity of exhaust gas may advantageously be stored in a space-saving manner and optionally in a weight-saving manner. On the other hand, a gas expansion from the exhaust gas container may thus advantageously be utilized for flowing a gas stream along the oxygen cathode during charging, and thus for saving electrical energy for operating the turbomachine system.

Within the scope of another specific embodiment, the exhaust gas container is therefore a pressure vessel. Gas low in oxygen which has lost oxygen during discharging may be stored under increased pressure in the exhaust gas container by the turbomachine, in particular in the form of a compressor or a pressure pump.

Within the scope of another specific embodiment, the exhaust gas supply line includes an exhaust gas supply line shut-off element for openably blocking the exhaust gas supply line. In particular, the exhaust gas container may include an exhaust gas container shut-off element for openably blocking the exhaust gas container. The exhaust gas supply line shut-off element or the exhaust gas container shut-off element may in particular have an automatically activatable design. For example, the exhaust gas supply line shut-off element or the exhaust gas container shut-off element may be an electrically activatable check valve and/or an electromagnetic actuator.

The oxygen cathode, in particular during discharging, may be supplied with oxygen or air, for example via an air inlet. Oxygen or air may flow from the outside into the cell or to the oxygen cathode via the air inlet, in particular during discharging. The air inlet may in particular be an air inlet of a turbomachine, explained below.

Oxygen released at the oxygen cathode during charging may be exhausted from the cell and in particular discharged from the oxygen cathode via an oxygen discharge line and/or oxygen opening, explained below.

In addition, the battery system may include an oxygen supply line for supplying an oxygen-rich gas to the oxygen cathode. The oxygen supply line may be, for example, a gas connection, for example a high-pressure connection, for connecting a gas line and/or a gas cylinder for supplying an oxygen-rich gas. Due to the battery system including an oxygen supply line for supplying an oxygen-rich gas to the oxygen cathode, oxygen needed as reactant may advantageously be supplied during discharging, thus promoting the discharging reaction which produces metal (per)oxide, for example lithium peroxide ($Li_2O_2$), and shifting the chemical equilibrium toward formation of the metal (per)oxide, for example lithium peroxide ($Li_2O_2$).

Within the scope of another specific embodiment, the battery system, in particular the oxygen supply line, includes an oxygen container for storing and releasing an oxygen-rich gas. In particular, during charging, oxygen-rich gas from the oxygen cathode, in particular oxygen released at the oxygen cathode, may be dischargeable into the oxygen container and in particular may be storable therein. During discharging, in particular oxygen-rich gas, for example stored oxygen, may be suppliable from the oxygen container to the oxygen cathode.

Oxygen-rich gas which has been enriched with oxygen during charging, for example oxygen released from the oxygen cathode during charging, which optionally may be pure oxygen, may advantageously be temporarily stored in the oxygen container. The oxygen-rich gas temporarily stored in the oxygen container, which may optionally be pure oxygen, may advantageously be supplied to the oxygen cathode during discharging, optionally occasionally also in pure form, and the quantity of oxygen may thus be increased by several times the required quantity, so that more oxygen is available than is needed for discharging, and the equilibrium is thus shifted toward formation of metal (per)oxide, for example lithium peroxide ($Li_2O_2$). In turn, the current density may thus advantageously be increased, and a booster function for the power density may be achieved. In addition, a oxygen gradient, which may be low, in the oxygen cathode may thus advantageously be achieved.

In principle, oxygen-enriched air as well as in particular essentially pure oxygen may be stored in the oxygen container. The discharging reaction may be improved, compared to air, by these two measures. The discharging reaction may advantageously be maximally promoted by supplying pure oxygen during discharging. However, storage of oxygen-enriched air may advantageously be achieved with a lower expenditure for safety measures.

The oxygen container may advantageously be used as a tank. The oxygen container may in particular be configured to be pressure-resistant, i.e., as a pressure vessel. Thus, on the one hand, a fairly large quantity of oxygen-rich gas may advantageously be stored in a space-saving manner and optionally in a weight-saving manner. On the other hand, a gas expansion from the oxygen gas container may thus advantageously be utilized for flowing a gas stream along the oxygen cathode during discharging, and thus for saving electrical energy for operating the turbomachine system.

Within the scope of another specific embodiment, the oxygen container is therefore a pressure vessel. Oxygen-rich gas may be stored under increased pressure in the oxygen container by the turbomachine, in particular in the form of a compressor or a pressure pump.

Within the scope of another specific embodiment, the oxygen supply line includes an oxygen supply line shut-off element for openably blocking the oxygen supply line. In particular, the oxygen container may include an oxygen container shut-off element for openably blocking the oxygen gas container. In particular, the oxygen supply line shut-off element or the oxygen container shut-off element may have an automatically activatable design. For example, the oxygen supply line shut-off element or the oxygen container shut-off element may be an electrically activatable check valve and/or an electromagnetic actuator.

Within the scope of another specific embodiment, the turbomachine system includes a turbomachine. For example, the turbomachine system may include a compressor or a blower as the turbomachine. For example, the turbomachine system may include a radial compressor or turbocompressor.

Turbomachines, such as gas compressors and so-called gas pumps, for example compressors or blowers, may be advantageously integrated in a space-saving manner and optionally in a weight-saving manner, in particular by using an intelligent package design. In addition, low-noise turbomachines having a long service life may be cost-effectively obtained. Even with a small turbomachine, the utilization of the capacity or energy of cells which include an oxygen cathode may advantageously be significantly improved.

In principle, the turbomachine system may include a, for example single, turbomachine which may be switched over between opposite flow directions, and thus, between a suction function and a blowing function.

However, the turbomachine system may include a, for example single, turbomachine, for example a compressor or a blower, which is configured for only one flow direction, for example solely for a blowing function or solely for a suction function, or which cannot be switched over between a suction function and a blowing function. Switching over the turbomachine system between the suction function and the blowing function may advantageously take place by activating at least one shut-off element, for example a flap, of a line system, in particular into which the, for example single, turbomachine, in particular with a single flow direction, for example solely with a blowing function or solely with a suction function, is integrated.

Within the scope of another specific embodiment, the turbomachine system therefore includes a, for example single, turbomachine which, for example, is configured for only one flow direction, for example solely for a blowing function or solely for a suction function, and a line system which is equipped with at least one shut-off element. For example, the line system may be equipped with one or multiple flap(s) and/or valve(s) and/or slider(s) as shut-off element(s). In particular, the line system may be equipped with one or multiple flap(s), for example with at least two flaps, as shut-off element(s).

Within the scope of another specific embodiment, the turbomachine system may be switched over between the suction function and the blowing function by activating at least one shut-off element, in particular of the line system.

For example, the turbomachine system may be switched over between the suction function and the blowing function by activating one or multiple valve(s) as shut-off element(s).

Use of a complex, costly turbomachine which may be switched over between opposite flow directions, for example between a suction function and a blowing function, as well as a combination of two or more turbomachines which have solely a suction function and/or solely a blowing function, may thus advantageously be dispensed with. In turn, costs, and optionally also weight, space, and/or energy may advantageously be saved in this way.

In particular, the turbomachine system may include a compressor. For example, the compressor may be a radial compressor or turbocompressor. For example, air may be supplied by the turbomachine from the outside, for example by an air inlet explained below, and/or oxygen-rich gas, for example oxygen-enriched air or oxygen, stored in particular in the oxygen container, and/or gas low in oxygen, for example oxygen-depleted air, stored in particular in the exhaust gas container, may be compressed. The pressure during discharging may thus advantageously be increased, and the volume-decreasing reaction may thus be promoted, and during discharging, the equilibrium may be shifted toward formation of metal (per)oxide, for example lithium peroxide ($Li_2O_2$). In addition, gas low in oxygen may advantageously be stored in the exhaust gas container, and/or oxygen-rich gas may be stored under increased pressure in the oxygen container, by the compressor.

Within the scope of one particular specific embodiment, the, for example single, turbomachine is a compressor. The blowing function or the blowing operation in particular may be referred to as a pressure function or pressure operation. For example, the compressor may be a so-called pressure pump. For example, the compressor may be a radial compressor or turbocompressor.

Within the scope of another specific embodiment, the turbomachine system includes an operating gas supply line for supplying an operating gas to the oxygen cathode. For example, the operating gas may be air and/or an oxygen-rich gas, for example oxygen-enriched air or oxygen. For example, gas, in particular operating gas, may be suppliable by the turbomachine to the oxygen cathode via the operating gas supply line.

Within the scope of another specific embodiment, the turbomachine system includes an oxygen discharge line for discharging an oxygen-rich gas from the oxygen cathode. In particular, oxygen-rich gas may be suppliable to the turbomachine via the oxygen discharge line. For example, gas, in particular oxygen-rich gas, for example oxygen or oxygen-enriched air, may be suppliable from the oxygen cathode to the turbomachine via the oxygen discharge line.

Within the scope of one embodiment, the turbomachine system includes an oxygen discharge line shut-off element for openably blocking the oxygen discharge line. In particular, the oxygen discharge line shut-off element may also be configured for openably blocking the operating gas supply line. The oxygen discharge line, for example during charging, may be openable or opened by the oxygen discharge line shut-off element. During discharging, the oxygen discharge line may be blockable or closed, for example by the oxygen discharge line shut-off element. The operating gas supply line, for example during charging, may be blockable or closed by the oxygen discharge line shut-off element. During discharging, the operating gas supply line may be openable or opened, for example by the oxygen discharge line shut-off element. In particular, during charging, the oxygen discharge line may be openable or opened by the oxygen discharge line shut-off element, and the operating gas supply line may be blockable or closed.

Within the scope of another specific embodiment, the turbomachine system includes an oxygen opening for exhausting oxygen-rich gas from the turbomachine. For example, gas, in particular oxygen-rich gas, for example oxygen-enriched air or oxygen, may be exhaustible from the turbomachine via the oxygen opening. The oxygen opening may also optionally be configured for admitting oxygen-rich gas into an oxygen container. If the oxygen opening is configured solely for exhausting air (see FIGS. 1a and 1b), the oxygen opening may optionally be equipped with a valve having a discharging function.

Within the scope of another embodiment, the turbomachine system includes an oxygen opening shut-off element, in particular for openably blocking the oxygen opening. The oxygen opening shut-off element may optionally also be configured for openably blocking the operating gas supply line. The oxygen opening may be openable or opened by the oxygen opening shut-off element, in particular during charging. If the battery system does not include an oxygen supply line, in particular does not include an oxygen container, the oxygen opening may be blockable or closed by the oxygen opening shut-off element during discharging. However, if the battery system includes an oxygen supply line, in particular an oxygen container, the oxygen opening may be blockable or closed, as well as openable or opened, by the oxygen opening shut-off element during discharging. In particular, for a, for example prior, discharge with air supplied from the outside, the oxygen opening may be blockable or closed by the oxygen opening shut-off element. For a, for example, later or subsequent discharge, in particular with supply of oxygen via the oxygen supply line, for example with supply of oxygen-rich gas, for example oxygen-enriched air or oxygen, stored in the oxygen container, the oxygen opening may then be openable or opened by the oxygen opening shut-off element. During charging, the operating gas supply line may optionally also be blockable or closed by the oxygen opening shut-off element. However, during discharging, the operating gas supply line may be openable or opened, in particular by the oxygen opening shut-off element.

The oxygen discharge line shut-off element and/or the oxygen opening shut-off element may be configured, for example, as a valve (changeover valve) which may be switched over in particular between suction operation and blowing operation, and/or as a flap (changeover flap) which may be switched over in particular between suction operation and blowing operation. For example, the oxygen discharge line shut-off element and/or the oxygen opening shut-off element may be shuttle valves. In particular, the oxygen discharge line shut-off element and/or the oxygen opening shut-off element may be automatically activatable. For example, the oxygen discharge line shut-off element and/or the oxygen opening shut-off element may be an automatically activatable flap and/or an automatically activatable valve.

Within the scope of one particular specific embodiment, the turbomachine system may be switched over between the suction function and the blowing function by activating the oxygen discharge line shut-off element and/or the oxygen opening shut-off element.

During suction operation of the turbomachine system, the oxygen discharge line may be opened in particular by the oxygen discharge line shut-off element. During the suction operation of the turbomachine system, the oxygen opening may also be opened, for example by the oxygen opening shut-off element. The operating gas supply line may be closed, for example during the suction operation of the turbomachine system, by the oxygen discharge line shut-off element and/or by the oxygen opening shut-off element.

During the blowing operation of the turbomachine system, the oxygen discharge line may be closed, in particular by the oxygen discharge line shut-off element. The operating gas supply line may be opened, for example during the blowing operation of the turbomachine system, by the oxygen discharge line shut-off element and/or by the oxygen opening shut-off element, in particular by the oxygen discharge line shut-off element and by the oxygen opening shut-off element.

If the battery system does not include an oxygen supply line, in particular does not include an oxygen container, the oxygen opening may be closed, in particular by the oxygen opening shut-off element, during the blowing operation of the turbomachine system.

However, if the battery system includes an oxygen supply line, in particular an oxygen container, in particular from which oxygen or oxygen-rich gas under increased pressure is releasable, the oxygen opening may be opened, in particular at least temporarily, by the oxygen opening shut-off element, for example, during the blowing operation of the turbomachine system.

Within the scope of another specific embodiment, oxygen or oxygen-rich gas is recyclable and/or circulatable, in particular temporarily or continuously, by the turbomachine system. For example, oxygen or oxygen-rich gas, in particular from the oxygen cathode, may be (temporarily) storable or (temporarily) stored in the oxygen container via the oxygen discharge line and the turbomachine, and optionally via the oxygen opening. Temporarily stored oxygen or temporarily stored oxygen-rich gas may then be resuppliable or resupplied to the circuit, in particular to the oxygen cathode, via the operating gas supply line. In particular, oxygen or oxygen-rich gas, compressed and/or under increased pressure, may be (temporarily) storable or (temporarily) stored in the oxygen container, which is configured in particular as a pressure vessel or pressure tank. In particular, the battery system may be operable or operated, at least temporarily or optionally continuously, as a closed system and/or with pure oxygen, for example in particular applications such as stationary applications. Costly selective membranes, for example which separate carbon dioxide, nitrogen, and/or water from oxygen, may thus advantageously be dispensed with.

In addition, the turbomachine may include an air inlet for admitting air into the turbomachine. In particular, air, for example from the outside, may be admittable into the turbomachine via the air inlet. For example, the air inlet may include a valve which has a feeding function. Gas, in particular oxygen-rich gas, for example oxygen-enriched air or oxygen, may optionally be addable or added to the air supplied via the air inlet from the oxygen supply line, in particular from the oxygen container. The air supplied via the air inlet may thus advantageously be additionally enriched with oxygen from the oxygen supply line. The chemical equilibrium may thus advantageously be shifted toward formation of the metal (per)oxide, for example lithium peroxide ($Li_2O_2$). In turn, the current density may thus advantageously be increased, and a booster function for the power density may be achieved.

Within the scope of one particular embodiment, during discharging, air containing oxygen-rich gas, in particular oxygen-enriched air or oxygen, is thus enrichable and suppliable to the oxygen cathode. The air may in particular be air which is admitted from the outside via the air inlet. The oxygen-rich gas, in particular during charging, may be, for example, oxygen-rich gas, for example oxygen-enriched air or oxygen, stored in the oxygen container. In particular, during discharging, air may thus be enrichable with oxygen-rich gas, for example oxygen-enriched air or oxygen, from the oxygen container and suppliable to the oxygen cathode.

In addition, the battery system may optionally include an air opening for admitting air into the battery system, in particular to the oxygen cathode. The air opening may be configured in particular for admitting air from the outside into the battery system.

In particular, during charging, air may be suppliable to the oxygen cathode via the air opening. For example, oxygen which is released at the oxygen cathode may be expellable by the air which is supplied via the air opening during charging. The air supplied via the air opening may advantageously exhaust or discharge the oxygen which is released at the oxygen cathode during charging, and may thus promote the charging reaction which subsequently produces oxygen, and may shift the chemical equilibrium in the electrochemical decomposition of the metal (per)oxide, for example lithium peroxide ($Li_2O_2$), toward oxygen formation. Thus, a higher charging current at the same charging voltage may likewise advantageously be achieved. During charging, gas from the exhaust gas supply line, in particular from the exhaust gas container, may optionally be addable or added to the air which is supplied via the air opening. The air supplied via the air opening may thus advantageously be additionally diluted with gas from the exhaust gas supply line. The chemical equilibrium in the electrochemical decomposition of the metal (per)oxide may thus advantageously be shifted even more strongly toward oxygen formation.

The air opening may optionally be configured for exhausting gas low in oxygen, in particular oxygen-depleted air, from the battery system, in particular from the oxygen cathode.

In particular, during discharging, gas low in oxygen, in particular oxygen-depleted air, remaining at the oxygen cathode may be dischargeable via the air opening. The air opening may thus optionally also be configured for exhausting gas low in oxygen, in particular oxygen-depleted air, remaining at the oxygen cathode to the outside during discharging.

The air opening may optionally include an air opening shut-off element for openably blocking the air opening. The air opening shut-off element may be a flap, a valve, or a slider, for example. If the air opening is configured solely for admitting air (see FIGS. 2a and 2b), the air opening may be equipped, for example, with a valve having a feeding function.

The at least one battery cell may also include one or multiple electrolytes. For example, the at least one battery cell may include one or multiple electrolytes which contain lithium ions.

In particular, the battery system may include at least two battery cells.

For example, the battery system may include a plurality of battery cells. For example, the battery system may include at least one battery module made up of interconnected battery cells. The battery cells may be interconnected in parallel and/or in series, for example. For example, the battery system may be a battery, or a so-called battery pack which includes at least one battery module. For example, the battery pack may include multiple interconnected battery modules.

In addition, the battery system may include a gas distributor (flow field). The gas distributor may be configured in particular for supplying air and/or oxygen-rich gas to the oxygen cathode during discharging, and/or for discharging oxygen-rich gas and/or air from the oxygen cathode during charging. The gas distributor may optionally also be configured for discharging gas low in oxygen from the oxygen cathode during discharging, and/or for supplying air and/or gas low in oxygen to the oxygen cathode during charging. In particular, the gas distributor may be configured for supplying the oxygen cathodes of multiple battery cells with air and/or oxygen-rich gas during discharging, and/or for discharging oxygen-rich gas and/or air therefrom during charging. The gas distributor may optionally also be configured for discharging gas low in oxygen from the oxygen cathodes of multiple battery cells during discharging, and/or for supplying air and/or gas low in oxygen during charging. For example, the gas distributor may include geometric (flow) channels and/or (flow) pores for this purpose. The (flow) channels and/or (flow) pores may be configured, for example, in such a way that each surface section of the oxygen cathodes is well accessible with uniform quantities of gas.

The battery system may be integrated, for example, into a stationary system, for example into a wind power plant and/or a photovoltaic system and/or a power store system, and/or into a mobile system, for example into a vehicle, such as a hybrid vehicle and/or an electric vehicle, and/or into a consumer application, for example a laptop and/or a mobile telephone. The present invention therefore also relates to a stationary system, for example a wind power plant and/or a photovoltaic system and/or a power store system, and/or a mobile system, for example a vehicle, such as a hybrid vehicle and/or an electric vehicle, which includes a battery system according to the present invention.

With regard to further technical features and advantages of the metal-oxygen battery system according to the present invention, explicit reference is hereby made to the discussion in conjunction with the operating method according to the present invention, and to the figures and the description of the figures.

A further subject matter of the present invention relates to an operating method for operating a metal-oxygen battery system. In particular, the operating method may be configured for operating a metal-oxygen battery system according to the present invention. For example, the operating method may be configured for operating a lithium-oxygen battery system.

The battery system may in particular include at least one battery cell, for example a lithium-oxygen cell, in particular including an oxygen cathode, a metal anode, and a metal ion-conducting separator situated between the cathode and the anode.

In the method, in particular gas low in oxygen which remains at a, or the, oxygen cathode during discharging, in particular of the at least one battery cell, may be stored. The gas low in oxygen which is stored may in particular be oxygen-depleted air which remains at the oxygen cathode during discharging. The gas low in oxygen, in particular the oxygen-depleted air, may be stored in particular in a, or the, exhaust gas container.

Alternatively or additionally, in the method, oxygen which is released at a, or the, oxygen cathode during charging, in particular of the at least one battery cell, may be expelled from the oxygen cathode by an (exhaust) gas. The (exhaust) gas via which the oxygen is expelled from the oxygen cathode may in particular contain air and/or a gas low in oxygen, for example oxygen-depleted air. The gas low in oxygen may likewise be oxygen-depleted air, in particular which has been stored during discharging.

The oxygen which is released at the oxygen cathode during charging may be exhausted, for example, by flowing the (exhaust) gas over the oxygen cathode. The oxygen may be exhausted, for example, by drawing in or blowing in the (exhaust) gas. In particular, the oxygen may be exhausted by drawing in the (exhaust) gas, for example air and/or gas low in oxygen, for example oxygen-depleted air.

Within the scope of one specific embodiment of the operating method, oxygen which is released at the oxygen cathode during charging is stored. The oxygen in particular may be stored in a, or the, oxygen container.

In particular, oxygen may be supplied to the oxygen cathode during discharging. This may take place, for example, by flowing an (operating) gas over the oxygen cathode. The (operating) gas may contain in particular air and/or an oxygen-rich gas. For example, the oxygen cathode may be supplied with oxygen by blowing in or drawing in the (operating) gas. In particular, this may take place by blowing in the (operating) gas.

Within the scope of another specific embodiment of the operating method, oxygen which has been stored beforehand during charging is supplied to the oxygen cathode during discharging.

Within the scope of another specific embodiment of the operating method, air is enriched with stored oxygen and supplied to the oxygen cathode during discharging.

The air may be supplied in particular from the outside. For example, air may be supplied from the outside via a, or the, air inlet. The stored oxygen may be in particular oxygen-rich gas or oxygen which has been stored beforehand during charging.

Within the scope of another specific embodiment of the operating method, air supplied from the outside and/or stored oxygen-rich gas, for example oxygen-enriched air or oxygen, in particular oxygen-rich gas, for example oxygen-enriched air or oxygen stored in a, or the, oxygen container, and/or stored gas low in oxygen, in particular gas low in oxygen stored in the exhaust gas container, is compressed.

(Operating) gas, in particular oxygen, and/or (exhaust) gas may optionally be recycled and/or circulated.

With regard to further technical features and advantages of the operating method according to the present invention, explicit reference is hereby made to the discussion in conjunction with the metal-oxygen battery system according to the present invention, and to the figures and the description of the figures.

Further advantages and advantageous embodiments of the subject matter according to the present invention are illustrated by the drawings and explained in the following description. It is pointed out that the drawings have only a descriptive character, and are not intended to limit the present invention in any way.

FIGS. 1a through 4c show that metal-oxygen battery system 100 includes at least one battery cell 10 which includes an oxygen cathode 11, a metal anode 12, and a metal ion-conducting separator 13 situated between cathode 11 and anode 12. Metal-oxygen battery system 100 may be a lithium-oxygen battery system, for example. The at least one battery cell 10 may in particular be a lithium-oxygen cell. Metal anode 12 may in particular be a lithium anode, and separator 13 may be a lithium ion-conducting separator.

FIGS. 1a through 4c show that battery system 100 also includes a gas distributor 11a which is configured for supplying air L and/or oxygen-rich gas $L+O_2$, $O_2$ to oxygen cathode 11 during discharging and for discharging gas low in oxygen $L-O_2$ from the oxygen cathode 11 during discharging, and for supplying air L and/or gas low in oxygen $L-O_2$ to oxygen cathode 11 during charging and for discharging oxygen-rich gas $L+O_2$, $O_2$ and/or air L from oxygen cathode 11 during charging.

FIGS. 1a through 4c show that battery system 100 also includes a turbomachine system 20, which is connected to oxygen cathode 11 in a gas-conducting manner and which in particular may be switched over between a suction function and a blowing function.

FIGS. 1a through 4c show that turbomachine system 20 includes a, in particular single, turbomachine 21, for example having only one flow direction. Turbomachine 21 may in particular be a compressor. FIGS. 1a through 4c indicate that turbomachine 21 also includes an air inlet 27 for admitting air L from the outside into turbomachine 21. Air inlet 27 may include, for example, a valve having a feeding function.

FIGS. 1a through 4c illustrate that turbomachine system 20 also includes an operating gas supply line 24 for supplying an operating gas L, $L+O_2$ to oxygen cathode 11, an oxygen discharge line 25 for discharging oxygen-rich gas $L+O_2$ from oxygen cathode 11, and an oxygen opening 26 for exhausting oxygen-rich gas $L+O_2$ from turbomachine 21.

FIGS. 1a through 4c show that turbomachine system 20 also includes an oxygen discharge line shut-off element 22 for openably blocking oxygen discharge line 25, and an oxygen opening shut-off element 23 for openably blocking oxygen opening 26. Oxygen discharge line shut-off element 22 and oxygen opening shut-off element 23 may be switchable flaps, for example.

FIGS. 1a through 3c show that, within the scope of the specific embodiments shown in FIGS. 1a through 3c, battery system 100 also includes an air opening 14 for admitting air L from the outside into battery system 100.

A comparison of FIGS. 1a, 2a, 3a, and 4a to corresponding FIG. 1b, 2b, 3b, or 4b shows that, within the scope of the specific embodiments shown, turbomachine system 20 may be switched over between the suction function and the blowing function by activating oxygen discharge line shut-off element 22 and oxygen opening shut-off element 23.

Figure 1A:
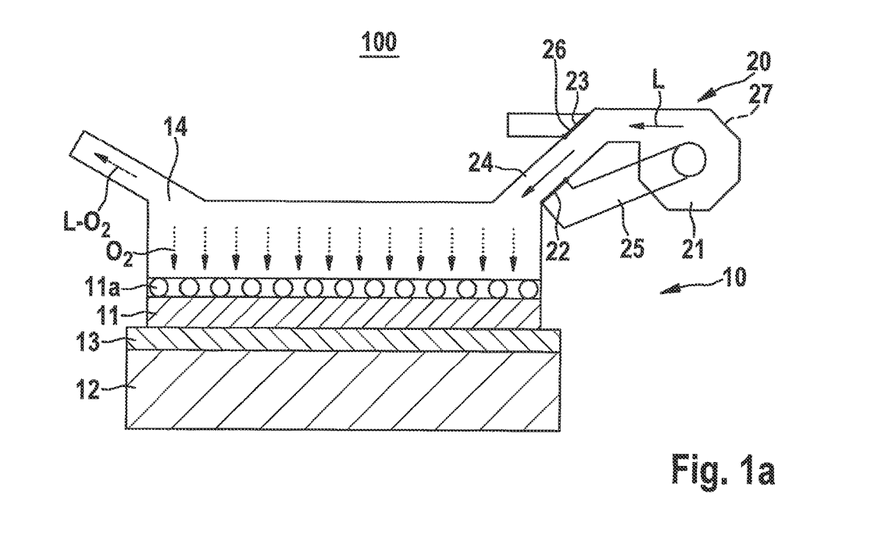
FIG. 1a shows a schematic cross section of one specific embodiment of a metal-oxygen battery system according to the present invention, together with a turbomachine system which may be switched over between a suction function and a blowing function, during discharging during the blowing operation.

FIG. 1a shows that during the blowing operation of turbomachine system 20, oxygen discharge line 25 is closed by oxygen discharge line shut-off element 22, and oxygen opening 26 is closed by oxygen opening shut-off element 23. In the process, operating gas supply line 24 is opened by oxygen discharge line shut-off element 22 and by oxygen opening shut-off element 23.

FIG. 1a also shows that the discharging of the at least one battery cell 10 takes place during the blowing operation. For the discharging, air L from the outside is admitted via air inlet 27 of turbomachine 21 and supplied by turbomachine 21 to oxygen cathode 11 via operating gas supply line 24. The oxygen $O_2$ from supplied air L reacts at oxygen cathode 11 to form metal (per)oxide, for example lithium peroxide ($Li_2O_2$), as the result of which gaseous oxygen $O_2$ is consumed and oxygen-depleted air $L-O_2$ remains. Oxygen-depleted air $L-O_2$ is subsequently exhausted from battery system 100 to the outside via air opening 14.

Figure 1B:
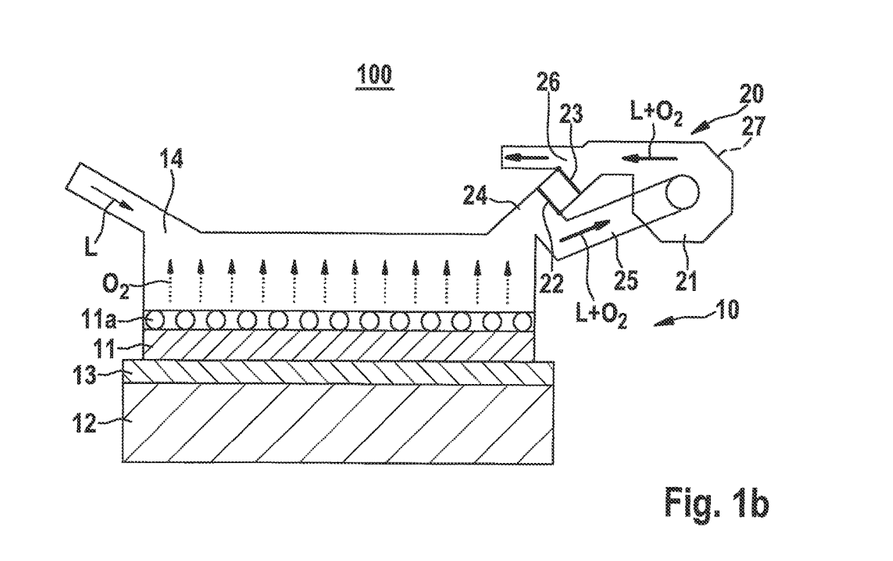
FIG. 1b shows a schematic cross section of the specific embodiment shown in FIG. 1a, during charging during the suction operation.

FIG. 1b shows that during the suction operation of turbomachine system 20, oxygen discharge line 25 is opened by oxygen discharge line shut-off element 22, and oxygen opening 26 is opened by oxygen opening shut-off element 23. In particular, in the process, operating gas supply line 24 is closed by oxygen discharge line shut-off element 22 and by oxygen opening shut-off element 23.

FIG. 1b also shows that the charging of the at least one battery cell 10 takes place during the suction operation. During charging, air L from the outside is initially drawn in via air opening 14 and thus admitted into battery system 100. Oxygen $O_2$ which is released at oxygen cathode 11 during charging is expelled from oxygen cathode 11 by admitted air L. Air L is thus enriched with oxygen $O_2$. Oxygen-enriched air $L+O_2$ is then supplied to turbomachine 21 via oxygen discharge line 25. Oxygen-enriched air $L+O_2$ is then exhausted from turbomachine 21 to the outside via oxygen opening 26.

Figure 2A:
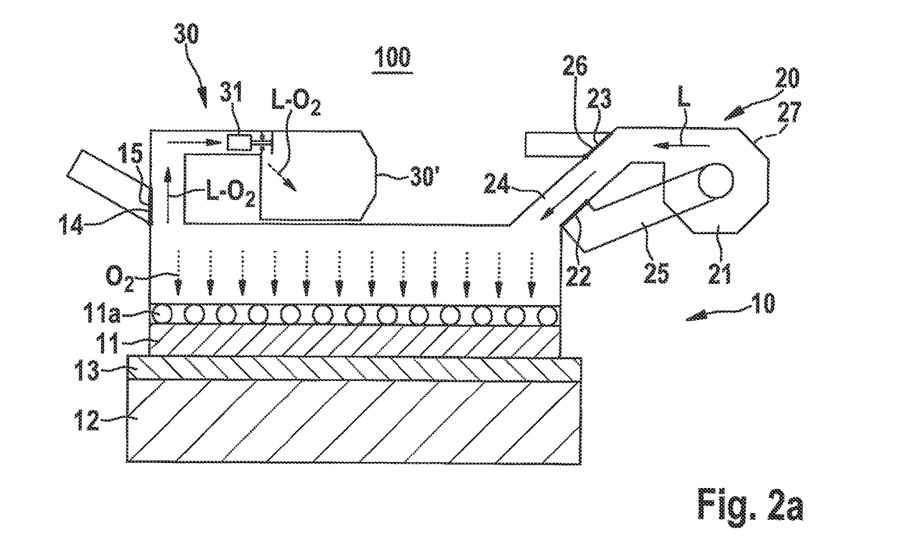
FIG. 2a shows a schematic cross section of another specific embodiment of a metal-oxygen battery system according to the present invention, together with a turbomachine system which may be switched over between a suction function and a blowing function, and an exhaust gas container, during discharging during the blowing operation.
Figure 2B:
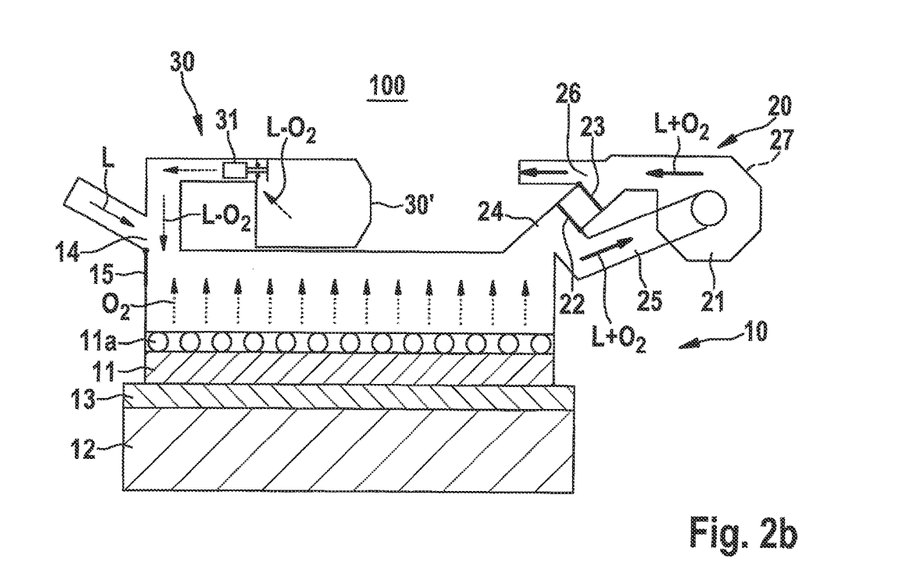
FIG. 2b shows a schematic cross section of the specific embodiment shown in FIG. 2a, during charging during the suction operation.

The specific embodiment shown in FIGS. 2a and 2b differs from the specific embodiment shown in FIGS. 1a and 1b essentially in that battery system 100 additionally includes an exhaust gas supply line 30 for supplying a gas low in oxygen $L-O_2$ to oxygen cathode 11, exhaust gas supply line 30 including an exhaust gas container 30' for storing and releasing a gas low in oxygen $L-O_2$, in particular oxygen-depleted air $L-O_2$. Exhaust gas container 30' is a pressure vessel. Exhaust gas container 30' includes an exhaust gas supply line shut-off element 31 for openably blocking exhaust gas container 30'.

In addition, the specific embodiment shown in FIGS. 2a and 2b further differs from the specific embodiment shown in FIGS. 1a and 1b in that air opening 14 includes an air opening shut-off element 15 for openably blocking air opening 14. Air opening shut-off element 15 is a valve having a feeding function. Within the scope of this specific embodiment, air opening 14 is therefore configured solely for admitting air.

FIG. 2a shows that oxygen-depleted air $L-O_2$, which remains when oxygen cathode 11 is discharged, is stored in exhaust gas container 30'. Oxygen-depleted air $L-O_2$ may be (temporarily) stored in compressed form in exhaust gas container 30' by turbomachine 21. Oxygen-depleted air $L-O_2$ in exhaust gas container 30' may also optionally be condensed. Exhaust gas container 30' may also be referred to as a condenser. FIG. 2a also shows that in the process, air opening 14 is closed by air opening shut-off element 15.

FIG. 2b shows that oxygen-depleted air $L-O_2$ which is stored in compressed form in exhaust gas container 30' is then supplied to oxygen cathode 11 during charging, and oxygen $O_2$ which is released at oxygen cathode 11 during charging is thus exhausted from oxygen cathode 11. FIG. 2b shows that air L may optionally be admixed with oxygen-depleted air $L-O_2$, and may be supplied via air opening 14, which is opened by air opening shut-off element 15.

Figure 3A:
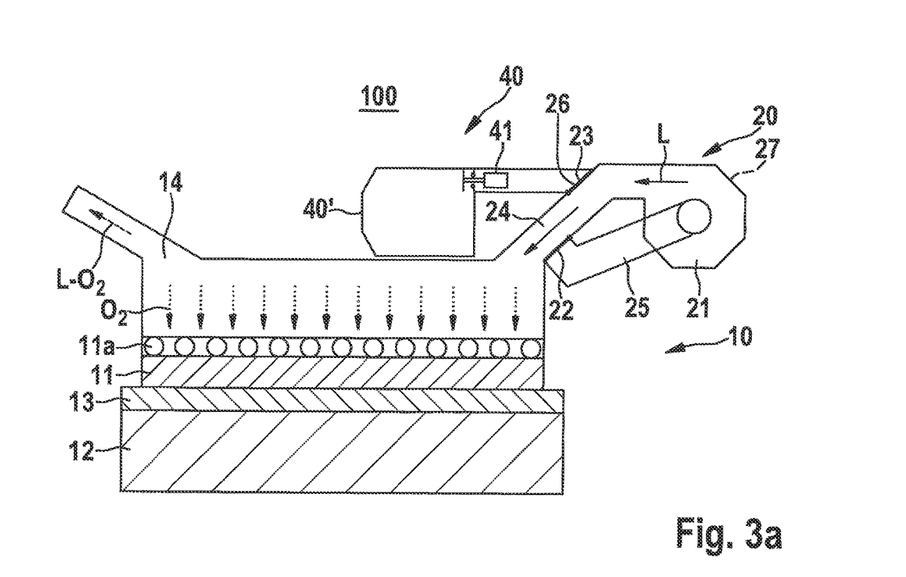
FIG. 3a shows a schematic cross section of another specific embodiment of a metal-oxygen battery system according to the present invention, together with a turbomachine system which may be switched over between a suction function and a blowing function, and an oxygen container, during prior discharging during the blowing operation.
Figure 3B:
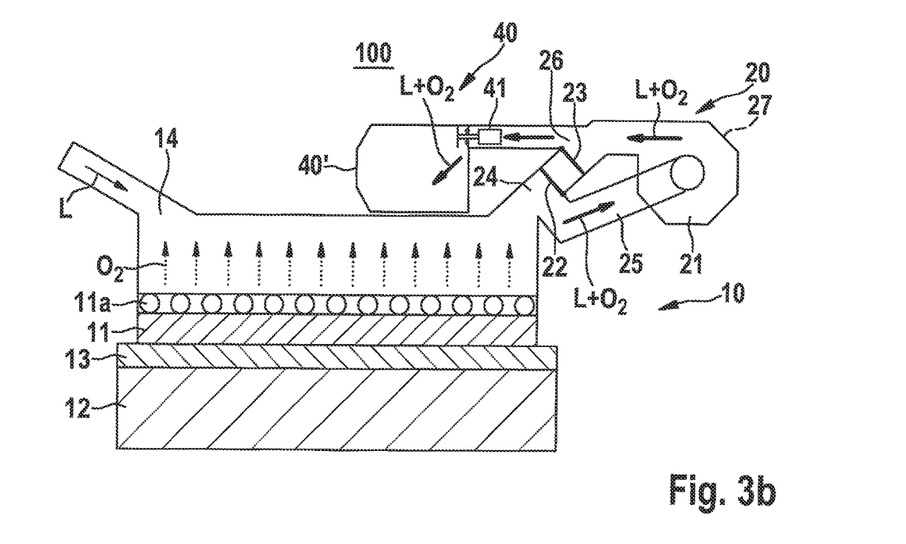
FIG. 3b shows a schematic cross section of the specific embodiment shown in FIG. 3a, during charging during the suction operation.
Figure 3C:
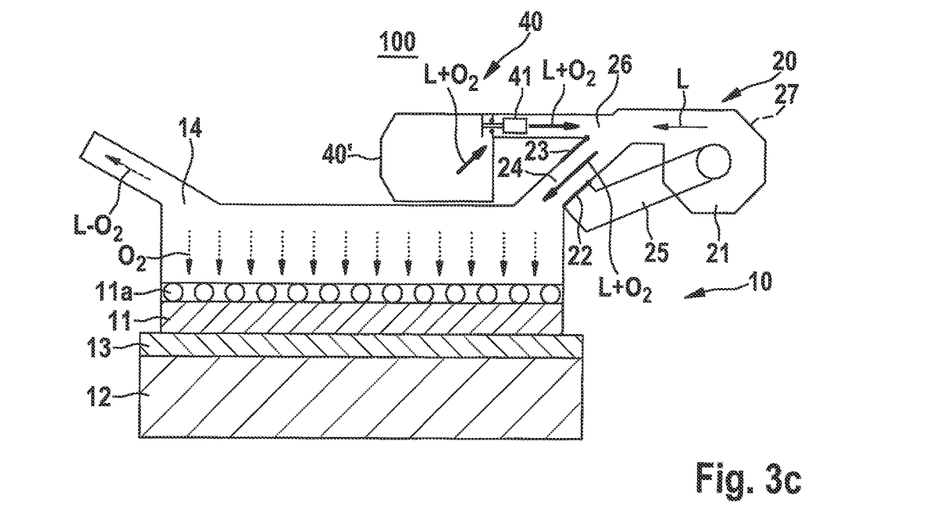
FIG. 3c shows a schematic cross section of the specific embodiment shown in FIGS. 3a and 3b, during subsequent discharging during the blowing operation.

The specific embodiment shown in FIGS. 3a, 3b, and 3c differs from the specific embodiment shown in FIGS. 1a and 1b essentially in that battery system 100 additionally includes an oxygen supply line 40 for supplying an oxygen-rich gas $L+O_2$ to oxygen cathode 11, oxygen supply line 40 including an oxygen container 40' for storing and releasing an oxygen-rich gas $L+O_2$, in particular oxygen-enriched air $L+O_2$. Oxygen container 40' is a pressure vessel. Oxygen container 40' includes an oxygen container-shut-off element 41 for openably blocking oxygen container 40'.

FIG. 3a shows that during prior discharging, in particular during the blowing operation of turbomachine system 20, air L from the outside is admitted into battery system 100 via air inlet 27, and is supplied by turbomachine 21 to oxygen cathode 11 via operating gas supply line 24, oxygen opening 26 being closed by oxygen opening shut-off element 23.

FIG. 3b shows that the charging takes place during the suction operation, a type of circulation of oxygen $O_2$ released at oxygen cathode 11 being carried out by turbomachine system 20. Oxygen $O_2$ released at oxygen cathode 11 is expelled by air L, and in the form of oxygen-enriched air $L+O_2$ is circulated by oxygen discharge line 25 and turbomachine 21, and is admitted into oxygen container 40' via oxygen opening 26, whose oxygen opening shut-off element 23 is open. Oxygen container 40' is used as a tank, in which oxygen $O_2$ may be (temporarily) stored in compressed form. Oxygen $O_2$ in oxygen container 40' may also optionally be condensed. Oxygen container 40' may also be referred to as a condenser.

FIG. 3c shows that during subsequent discharging, in particular during the blowing operation of turbomachine system 20, oxygen opening 26 may be opened by oxygen opening shut-off element 23. During discharging, oxygen $O_2$ which has been stored beforehand in the form of oxygen-enriched air $L+O_2$ during charging may advantageously be supplied to oxygen cathode 11. In particular, air L which is admitted from the outside via air inlet 27 may be enriched with stored oxygen $L+O_2$ and supplied to oxygen cathode 11.

Figure 4A:
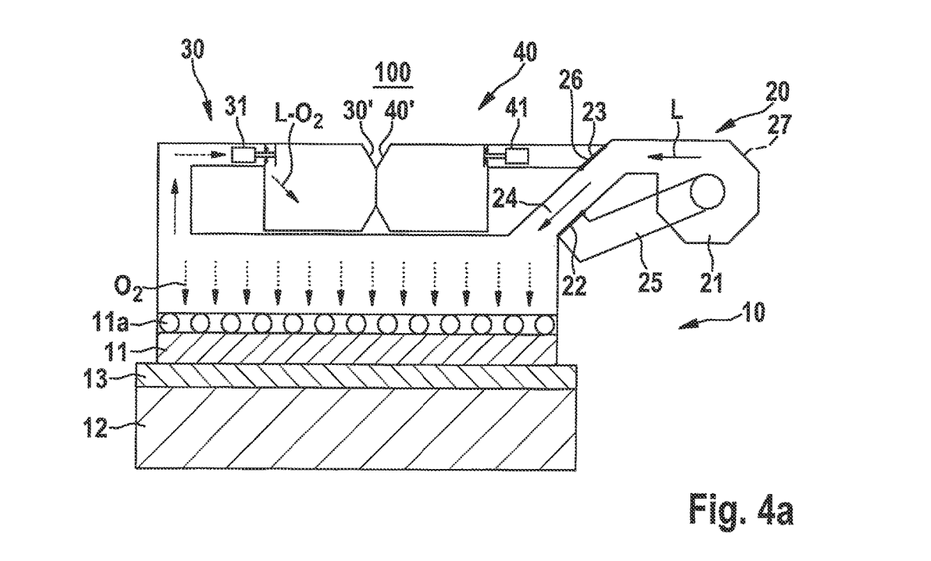
FIG. 4a shows a schematic cross section of another specific embodiment of a metal-oxygen battery system according to the present invention, together with a turbomachine system which may be switched over between a suction function and a blowing function, and an exhaust gas container and an oxygen container, during prior discharging during the blowing operation.
Figure 4B:
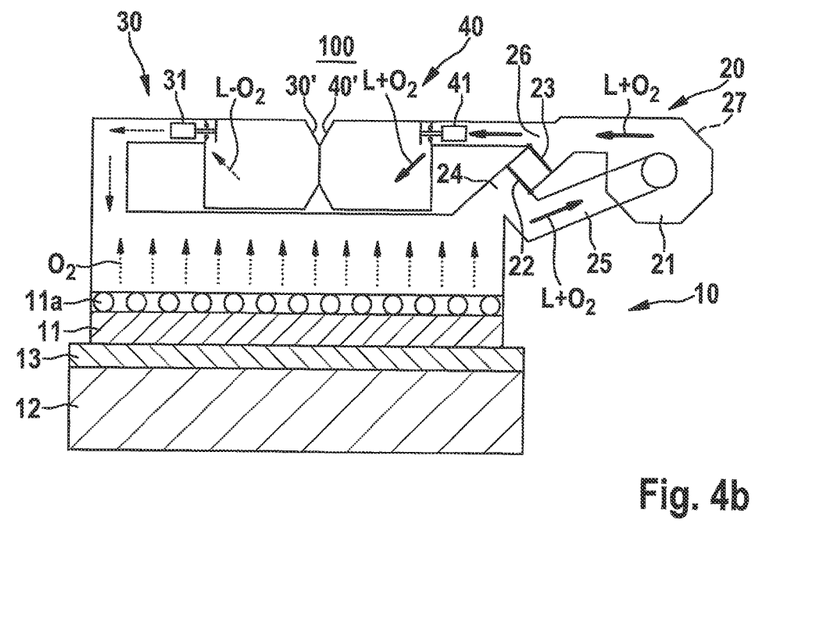
FIG. 4b shows a schematic cross section of the specific embodiment shown in FIG. 4a, during charging during the suction operation.
Figure 4C:
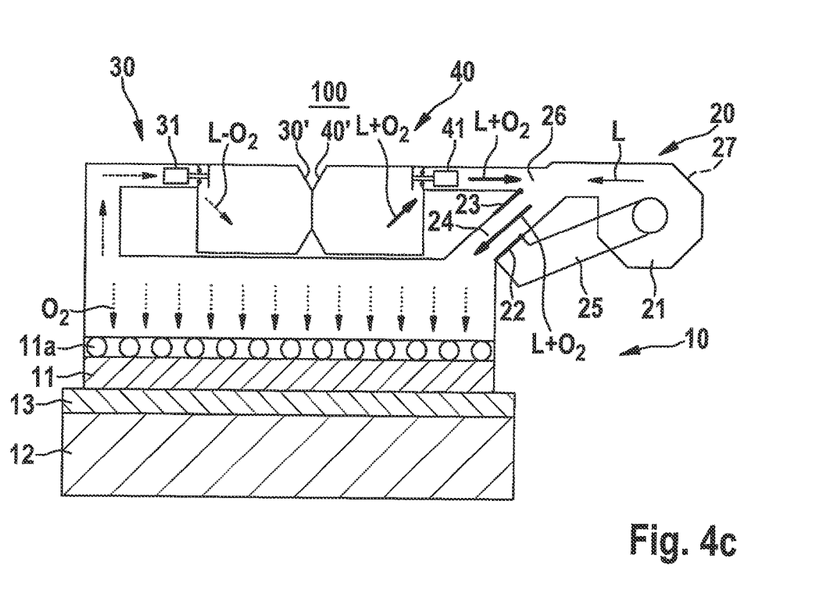
FIG. 4c shows a schematic cross section of the specific embodiment shown in FIGS. 4a and 4b, during subsequent discharging during the blowing operation.

The specific embodiment shown in FIGS. 4a, 4b, and 4c differs from the specific embodiment shown in FIGS. 1a and 1b essentially in that battery system 100 additionally includes an exhaust gas supply line 30 for supplying a gas low in oxygen $L-O_2$ to oxygen cathode 11, including an exhaust gas container 30' for storing and releasing a gas low in oxygen $L--O_2$, in particular oxygen-depleted air $L-O_2$, and an oxygen supply line 40 for supplying an oxygen-rich gas $L+O_2$ to oxygen cathode 11, including an oxygen container 40' for storing and releasing an oxygen-rich gas $L+O_2$, in particular oxygen-enriched air $L+O_2$. Exhaust gas container 30' and oxygen container 40' are in each case pressure vessels. Exhaust gas container 30' includes an exhaust gas supply line shut-off element 31 for openably blocking exhaust gas container 30', and oxygen container 40' includes an oxygen container-shut-off element 41 for openably blocking oxygen container 40'.

FIG. 4a shows that during prior discharging or during start-up, in particular during the blowing operation of turbomachine system 20, air L is admitted from the outside into battery system 100 via air inlet 27, and is supplied by turbomachine 21 to oxygen cathode 11 via operating gas supply line 24, oxygen opening 26 being closed by oxygen opening shut-off element 23. Oxygen $O_2$ from supplied air L reacts at oxygen cathode 11 to form metal (per)oxide, for example lithium peroxide ($Li_2O_2$), as the result of which gaseous oxygen $O_2$ is consumed and oxygen-depleted air $L-O_2$ remains. Oxygen-depleted air $L-O_2$ is then stored in exhaust gas container 30'. Oxygen-depleted air $L-O_2$ may be (temporarily) stored in compressed form in exhaust gas container 30' by turbomachine 21.

FIG. 4b shows that oxygen-depleted air $L-O_2$ which is stored in compressed form in exhaust gas container 30' is then supplied to oxygen cathode 11 during charging, and oxygen $O_2$ which is released at oxygen cathode 11 during charging is thus exhausted from oxygen cathode 11. FIG. 4b also shows that in the process, oxygen opening 26 is opened by oxygen opening shut-off element 23, so that oxygen-enriched air $L+O_2$ is admitted by turbomachine 21 into oxygen container 40' via oxygen opening 26, where it may be (temporarily) stored in compressed form.

FIG. 4c shows that during subsequent discharging or after start-up, in particular during the blowing operation of turbomachine system 20, oxygen opening 26 may be opened by oxygen opening shut-off element 23. During discharging, oxygen $O_2$ which has been stored beforehand in the form of oxygen-enriched air $L+O_2$ in oxygen container 40' during charging may advantageously be supplied to oxygen cathode 11. Gas low in oxygen $L-O_2$ and oxygen-rich gas $L+O_2$ may thus advantageously be recycled or reused by exhaust gas container 30', oxygen container 40', and turbomachine system 20. FIG. 4c indicates that air L may optionally additionally be supplied from the outside via air inlet 27.

What is claimed is:

1. A metal-oxygen battery system, comprising:
    at least one battery cell, including an oxygen cathode, a metal anode, and a metal ion-conducting separator situated between the cathode and the anode; and
    a turbomachine system connected to the oxygen cathode in a gas-conducting manner and which is switchable over between a suction function and a blowing function, and an exhaust gas supply line to supply a gas low in oxygen to the oxygen cathode;
    wherein the turbomachine system is equipped with a suction function and a blowing function, so that supplying gas, which includes oxygen, to the oxygen cathode, and discharging gas, which includes oxygen, from the oxygen cathode is facilitated by the turbomachine system.

2. The battery system of claim 1, wherein the exhaust gas supply line includes an exhaust gas container for storing and releasing a gas low in oxygen.

3. The battery system of claim 1, further comprising:
an oxygen container to store and release an oxygen-rich gas.

4. The battery system of claim 2, wherein at least one of the exhaust gas container and an oxygen container includes a pressure vessel.

5. The battery system of claim 1, wherein the exhaust gas supply line includes an exhaust gas supply line shut-off element for openably blocking the exhaust gas supply line, and/or wherein an oxygen container includes an oxygen container-shut-off element for openably blocking the oxygen container.

6. The battery system of claim 1, wherein the turbomachine system includes a turbomachine, and a line system equipped with at least one shut-off element, and wherein the turbomachine system is switchable over between the suction function and the blowing function by activating at least one shut-off element.

7. The battery system of claim 6, wherein the turbomachine is a compressor.

8. The battery system of claim 1, wherein the turbomachine system includes:
a turbomachine;
an operating gas supply line to supply an operating gas to the oxygen cathode;
an oxygen discharge line to discharge an oxygen-rich gas from the oxygen cathode;
an oxygen discharge line shut-off element to openably block the oxygen discharge line;
an oxygen opening to exhaust oxygen-rich gas from the turbomachine; and
an oxygen opening shut-off element to openably block the oxygen opening; and
wherein gas is suppliable by the turbomachine to the oxygen cathode via the operating gas supply line, gas is suppliable from the oxygen cathode to the turbomachine via the oxygen discharge line, and gas is exhaustible from the turbomachine via the oxygen opening, and which is admittable into the oxygen container.

9. The battery system of claim 1, wherein the turbomachine system is switchable over between the suction function and the blowing function by activating an oxygen discharge line shut-off element and/or an oxygen opening shut-off element,
wherein during the suction operation of the turbomachine system, an oxygen discharge line is opened by the oxygen discharge line shut-off element, and an oxygen opening is opened by the oxygen opening shut-off element, which is during the suction operation of the turbomachine system, an operating gas supply line is closed by the oxygen discharge line shut-off element and/or by the oxygen opening shut-off element, and
wherein during the blowing operation of the turbomachine system, the oxygen discharge line is closed by the oxygen discharge line shut-off element, which is during the blowing operation of the turbomachine system, the operating gas supply line is opened by the oxygen discharge line shut-off element and by the oxygen opening shut-off element.

10. The battery system of claim 1, wherein oxygen or oxygen-rich gas is recyclable and/or circulatable by the turbomachine system.

11. The battery system of claim 1, wherein the at least one battery cell includes a lithium-oxygen cell, and the anode is a lithium anode, which is made of metallic lithium or a lithium alloy, and the separator is conductive for lithium ions.

12. The battery system of claim 1, wherein the metal-oxygen battery system includes a lithium-oxygen battery system, and wherein the at least one battery cell includes a lithium-oxygen cell.

13. An operating method for operating a metal-oxygen battery system, the method comprising:
performing at least one of the following:
storing a gas low in oxygen which remains at an oxygen cathode during discharging; and
expelling oxygen released at an oxygen cathode during charging from the oxygen cathode by a gas;
wherein the metal-oxygen battery system includes:
at least one battery cell, including the oxygen cathode, a metal anode, and a metal ion-conducting separator situated between the cathode and the anode; and
at least one of: (i) a turbomachine system connected to the oxygen cathode in a gas-conducting manner and which is switchable over between a suction function and a blowing function, and (ii) an exhaust gas supply line to supply a gas low in oxygen to the oxygen cathode.

14. The battery system of claim 13, wherein oxygen which is released at the oxygen cathode during charging is stored, and/or wherein oxygen which has been stored beforehand during charging is supplied to the oxygen cathode during discharging.

15. The battery system of claim 13, wherein air is enriched with stored oxygen and supplied to the oxygen cathode during discharging.

16. The battery system of claim 13, wherein air which is supplied from the outside, and/or stored oxygen, and/or wherein stored gas low in oxygen is/are compressed.

* * * * *